(12) United States Patent
DeWinter

(10) Patent No.: US 8,100,447 B2
(45) Date of Patent: Jan. 24, 2012

(54) SHOVEL WITH MULTIPLE BLADE FACES

(76) Inventor: David S. DeWinter, Luther, MI (US)

( * ) Notice: Subject to any disclaimer, the term of this patent is extended or adjusted under 35 U.S.C. 154(b) by 231 days.

(21) Appl. No.: 12/026,949

(22) Filed: Feb. 6, 2008

(65) Prior Publication Data

US 2008/0185856 A1 Aug. 7, 2008

Related U.S. Application Data

(60) Provisional application No. 60/899,740, filed on Feb. 6, 2007.

(51) Int. Cl.
*E01H 5/02* (2006.01)
(52) U.S. Cl. .............. 294/51; 294/54.5; 37/285
(58) Field of Classification Search .............. 294/49, 294/51, 53.5, 54.5, 55; 37/265, 267, 284, 37/285
See application file for complete search history.

(56) References Cited

U.S. PATENT DOCUMENTS

| | | | | |
|---|---|---|---|---|
| 157,078 A * | 11/1874 | Parker et al. | .............. | 37/274 |
| 956,896 A * | 5/1910 | Gross | .............. | 37/273 |
| 1,202,791 A * | 10/1916 | Brownstein | .............. | 37/267 |
| 1,572,824 A * | 2/1926 | Tatge | .............. | 37/283 |
| 1,820,692 A * | 8/1931 | Cooper | .............. | 37/274 |
| 1,839,285 A * | 1/1932 | Winkie | .............. | 294/54.5 |
| 2,347,963 A * | 5/1944 | O'Neill | .............. | 15/245 |
| 2,728,598 A | 12/1955 | Szillage | | |
| 2,785,483 A * | 3/1957 | Gajewski | .............. | 37/284 |
| 2,895,237 A * | 7/1959 | Abrahams | .............. | 37/277 |
| 3,727,964 A * | 4/1973 | Nordvik | .............. | 37/268 |
| 4,947,562 A * | 8/1990 | Williamson | .............. | 37/197 |
| 5,159,769 A * | 11/1992 | Odorisio | .............. | 37/278 |
| 5,791,072 A * | 8/1998 | Schbot | .............. | 37/278 |
| 6,109,362 A * | 8/2000 | Simpson, Sr. | .............. | 172/375 |
| 6,435,580 B1 | 8/2002 | Lock | | |
| 2005/0268498 A1* | 12/2005 | Fortino | .............. | 37/285 |

* cited by examiner

*Primary Examiner* — Dean Kramer
(74) *Attorney, Agent, or Firm* — Price Heneveld LLP

(57) ABSTRACT

A shoveling implement includes an elongate handle which may be pivotally attached to a shovelhead having at least two blade faces. The shovelhead may be configured so that the blade faces always remain at a fixed angle to the ground, or may be designed as a combination scoop and pusher shovel, with either blade being utilized by rotating the handle 180 degrees.

2 Claims, 5 Drawing Sheets

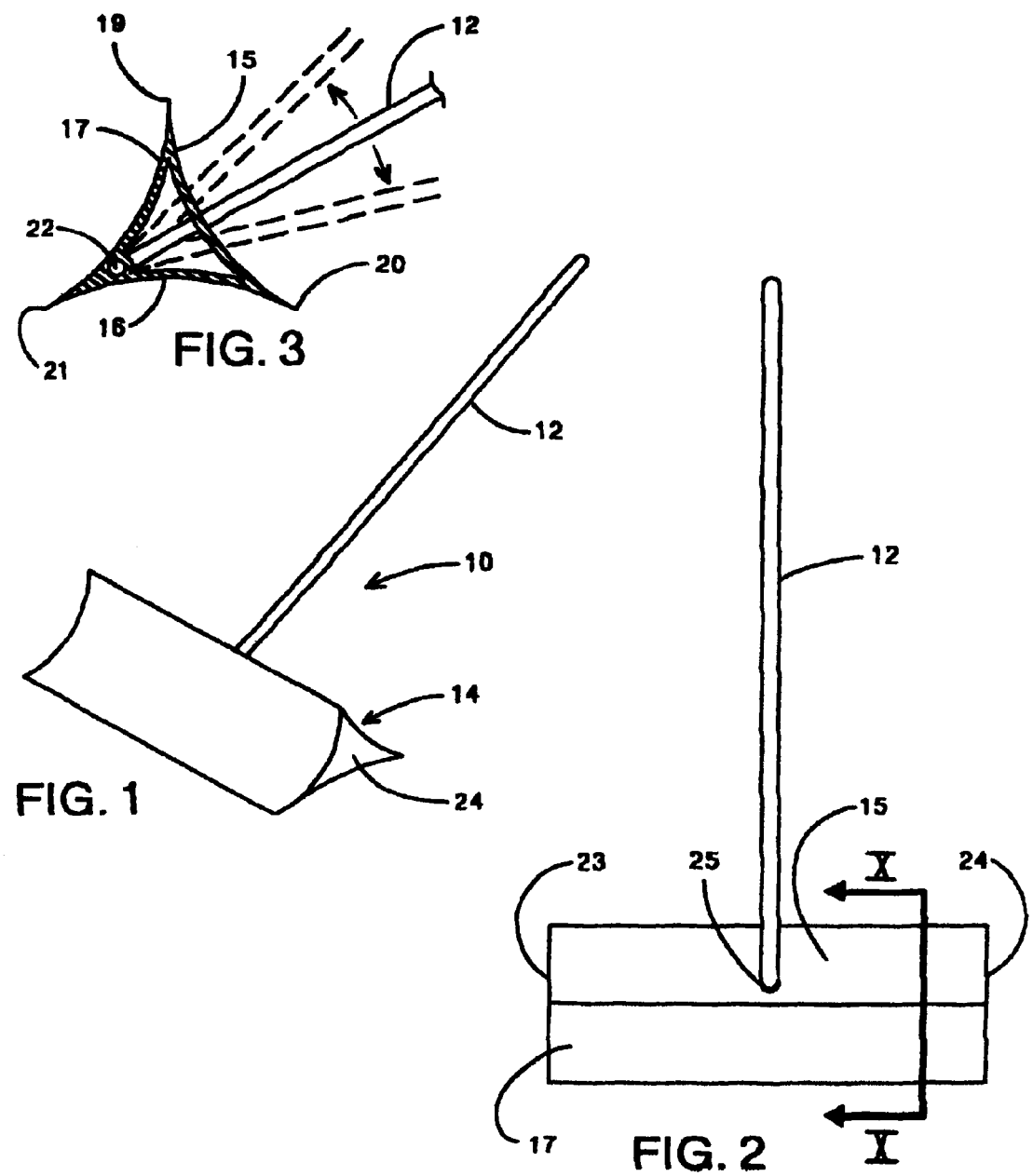

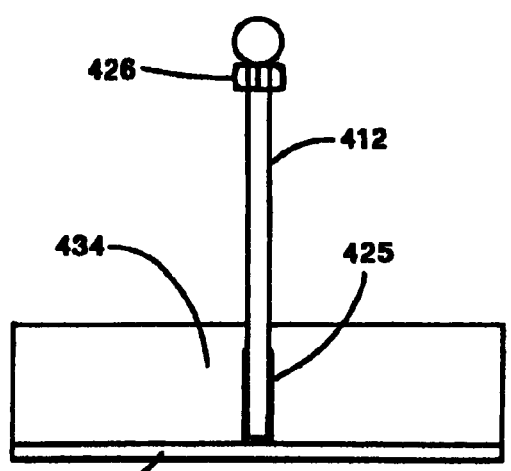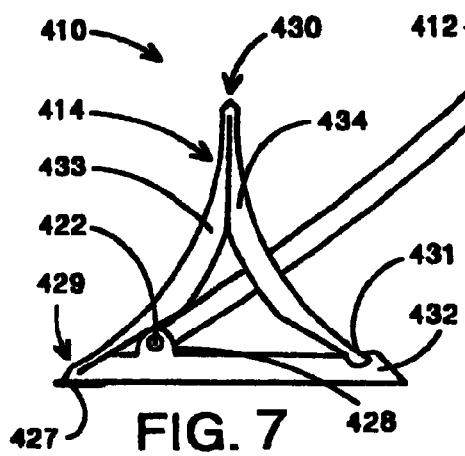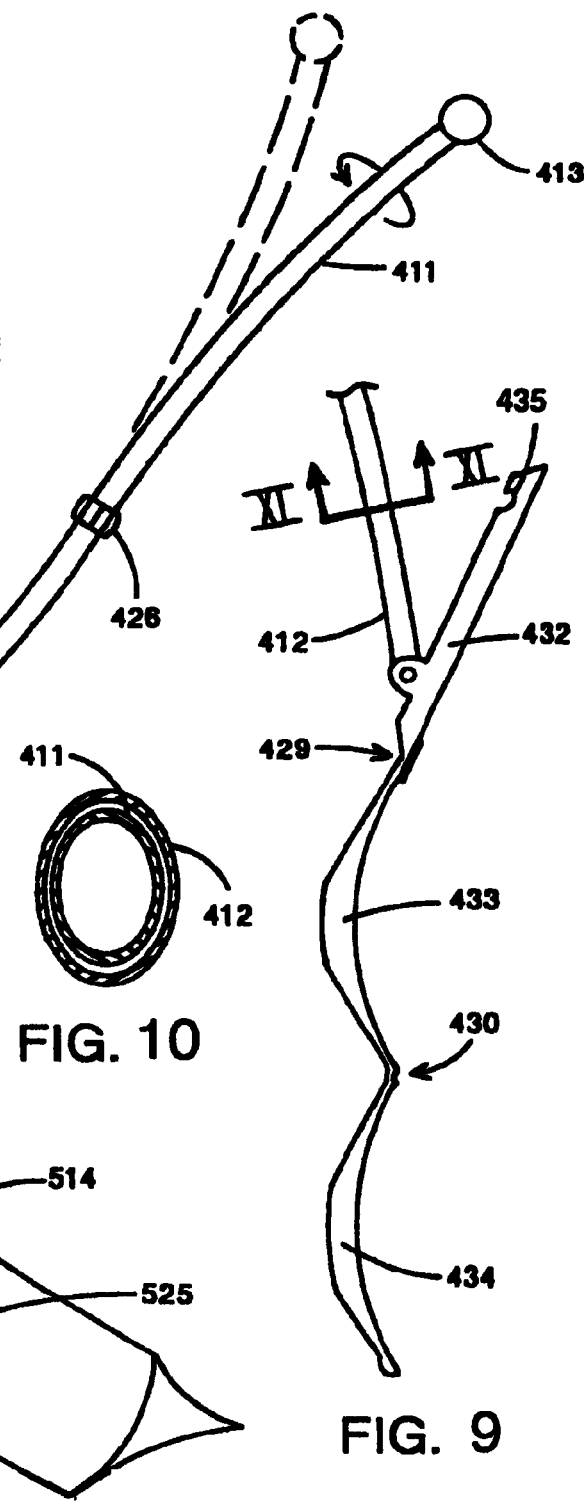

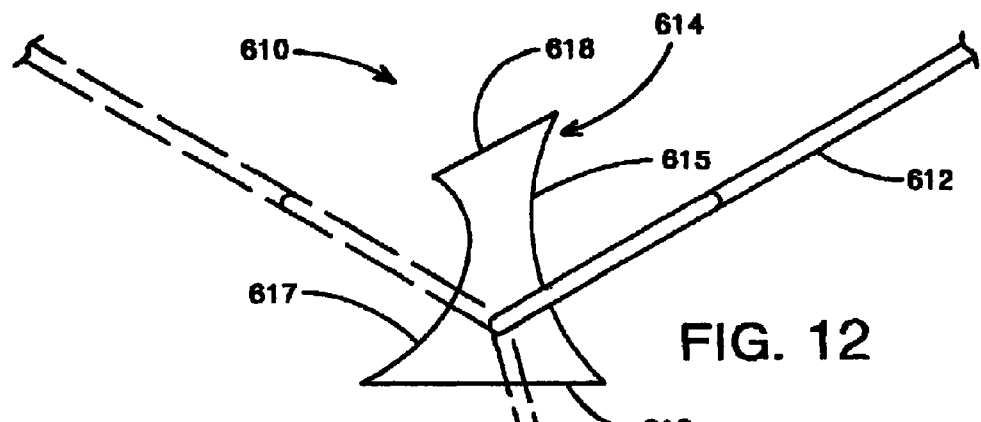
FIG. 12
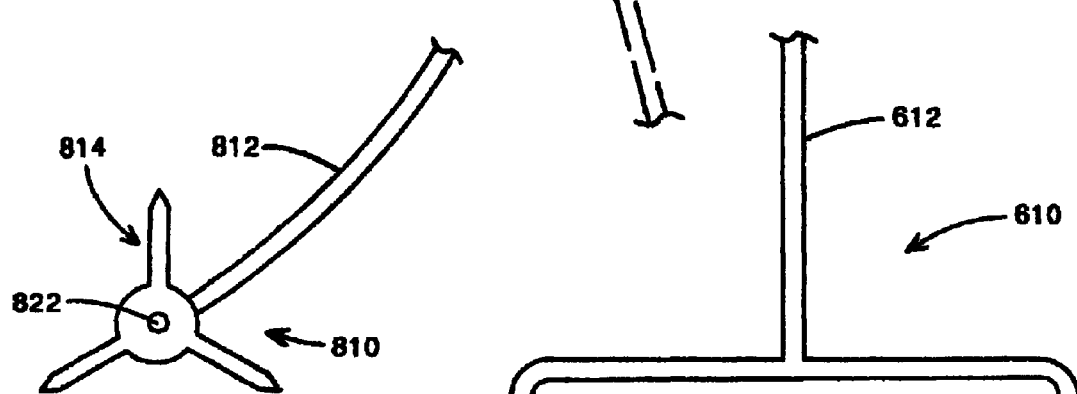
FIG. 14
FIG. 13

US 8,100,447 B2

SHOVEL WITH MULTIPLE BLADE FACES

CROSS REFERENCE TO RELATED APPLICATION

This application claims priority under 35 U.S.C. §119(e) on U.S. Provisional Application No. 60/899,740 entitled SHOVEL WITH MULTIPLE BLADE FACES, filed Feb. 6, 2007, by David S. DeWinter, the entire disclosure of which is incorporated herein by reference.

FIELD OF THE INVENTION

This invention relates to a shovel with two or more useable blade faces, which makes the job of shoveling easier.

BACKGROUND OF THE INVENTION

Anyone with shoveling experience knows that it can be very strenuous work, and any shovel improvements that would make the job easier would be welcome and desirable.

Hand shovels are commonly used for moving many different types of material, and there are basically three different types of shovels: digging shovels, which are generally used for digging and excavating; scoop shovels, which are generally used to lift and heave material; and pusher shovels, which are generally used to push material across the ground. Some pusher shovels can lift and heave material, but others (with a more vertical blade) cannot.

With one exception, all known hand shovels have shovelheads with only one useable blade face (or surface).

U.S. Pat. No. 2,728,598 discloses a combination shovel and pusher having a shovelhead comprised of two hinged blade portions, with the upper portion also being pivotally connected to the elongate shaft, such that the angular position of the upper blade face with respect to the shaft is adjustable. However, because the lower portion of the blade is permanently fixed to the shaft, the angle of the lower blade face with respect to the ground mimics the angular position of the shaft with respect to the ground. Moreover, this shovel cannot be used as such when the shaft is rotated 180 degrees, and is not intended to pull material across the ground.

U.S. Pat. No. 6,435,580 B1 discloses a pusher-type shovel having a single blade which may be pivotally attached to the handle, however the pivotal connection only allows the handle to pivot on an axis which is perpendicular to the longitudinal direction of the shovelhead. Accordingly, this shovel lacks the ergonomic benefits of a handle which can freely pivot on an axis which is parallel to the longitudinal direction of the shovelhead; and this shovel cannot be used to pull snow.

Because the realized benefits of the above described shovels are negligible, there is a need for a more useful, versatile shovel.

SUMMARY OF THE INVENTION

The invention satisfies the need for a more useful and versatile shovel by providing a shovelhead which can be embodied as a pusher, a scoop, or a combination of the two shapes, and can include two or more useable blade faces. Additionally, some of the embodiments described herein include three or more useable blade faces, any of which can be utilized by rotating the elongate shaft 180 degrees; and some can be used to pull material across the ground and other surfaces, and may include a pivotally attached handle, which makes the work even easier.

These and other features, advantages and objects of the present invention will be further understood and appreciated by those skilled in the art by reference to the following specification, claims and appended drawings.

BRIEF DESCRIPTION OF THE DRAWINGS

FIG. 1 is a perspective view of a pusher/puller shovel in accordance with a first embodiment of the invention.

FIG. 2 is a top view of the tool shown in FIG. 1.

FIG. 3 is a cross-sectional view of the tool shown in FIGS. 1 and 2, as seen along view lines X-X of FIG. 2.

FIG. 7 is a side view of a pusher/puller shovel in accordance with a fourth embodiment of the invention.

FIG. 8 is a rear view of the shovelhead shown in FIG. 7, with an extendable (telescopic) shaft fully retracted.

FIG. 9 is a side view of the shovelhead shown in FIG. 7, with the panels unfolded and shaft fully retracted.

FIG. 10 is a cross-sectional view of the tool shown in FIG. 9, as seen along view lines XI-XI of FIG. 9.

FIG. 11 is a perspective view of a pusher/puller shovel in accordance with a fifth embodiment of the invention.

FIG. 12 is a side view of a pusher/puller shovel in accordance with a sixth embodiment of the invention.

FIG. 13 is a top view of the tool shown in FIG. 12.

FIG. 14 is a side view of a pusher/scraper in accordance with a seventh embodiment of the invention.

DETAILED DESCRIPTION OF SPECIFIC EMBODIMENTS

Figure 4:
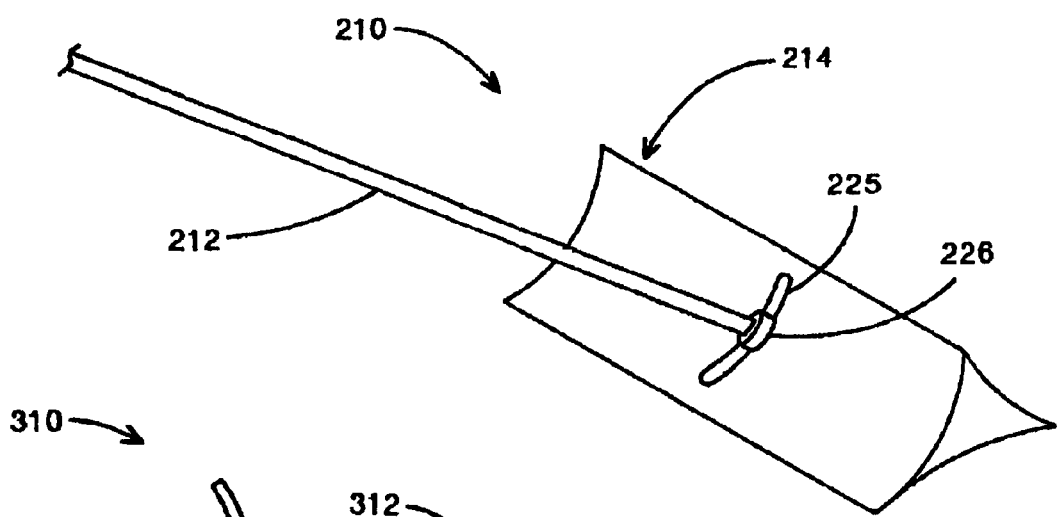
FIG. 4 is a perspective view of a pusher/puller shovel in accordance with a second embodiment of the invention.

The invention provides a shovel with a shovelhead having two or more useable blade faces, with at least one blade face having a generally concave surface. All of the illustrated embodiments include two or more blade faces which share at least one common horizontal edge. The shovelhead can be manufactured as a permanently rigid structure, or can be comprised of hinged panels which can be disconnected and folded flat, for easier storage of the shovel. The shovelhead can be made of plastic, metal and/or any other suitable material, including styrofoam, plastic, or rubber, to be used for clearing snow from cars and trucks.

In an aspect of the invention, the shovel is embodied as a snow pusher/puller, having a shovelhead with two or more blade faces which share at least one common lateral edge. The handle can be attached to allow pivoting of the shaft with respect to the shovelhead vertically and horizontally. Because the (assembled) shovelhead is a rigid structure, the blade face being utilized is always at the same (correct) angle to the ground, irrespective of the shaft-to-ground angle. This means that the user does not have to maintain a precise shaft-to-ground angle in order to effectively scrape the ground surface. The pivoting handle also benefits both tall and short people, and makes pushing snow up or down a sloped driveway much easier, because the handle can be held at a comfortable position. This tool can also be designed so that the longitudinal axis of the shovelhead, with respect to the longitudinal axis of the elongate shaft, can be changed. Additionally, the elongate shaft can be locked in any position within its range of travel, to accommodate specific shoveling needs.

In accordance with another aspect of the invention, the shovel is embodied as a combination scoop-pusher. Either blade face can be used by rotating the handle 180 degrees. This enables the user to easily optimize the tool by using whichever blade face is best suited for the application, and also eliminates the need to buy, store, and use two different shovels.

In accordance with a further aspect of the invention, the tool can be configured as a floor pusher/scraper, and along with the other shovels described herein, may include a curved telescoping shaft comprised of two or more segments. This handle is especially useful for pulling snow from rooftops and out from under cars and trucks.

The expression "rotatably attached" as used herein refers to an attachment wherein the shovelhead can be freely rotated more than 360 degrees with respect to the shaft, whereas "pivotally attached" as used herein means that angular movement of the shovelhead with respect to the shaft is limited to less than 360 degrees.

An embodiment of a shoveling tool 10 is shown in FIGS. 1-3. Tool 10 includes an elongate shaft 12 and a shovelhead 14. Shovelhead 14 has three separate blade faces 15, 16, 17 and may be used to either push or pull material (i.e.,—snow) across the ground, or other surface. Panels 23 and 24 enclose the ends of shovelhead 14, which is a hollow structure. Alternatively, shovelhead 14 of this invention can also be manufactured as a substantially solid piece of homogeneous material. Additionally, the curved shape of the three individual blade faces 15, 16, 17 may vary, allowing tool 10 to be further optimized by simply rotating the elongate shaft 12 180 degrees. Shaft 12 of tool 10 is pivotally connected to shovelhead 14 via a horizontal pin 22 which passes through a cylindrical bore in shovelhead 14.

Shovelhead 14 of tool 10 is a permanently rigid structure, with blade faces 15, 16, 17 sharing common lateral edges 19, 20, 21. Blade face 15 includes an elongate aperture 25 through which the shaft 12 extends from its pivotal connection to shovelhead 14. Aperture 25 is similar to aperture 225 of FIG. 4, and serves to both guide the shaft 12 as it pivots, and limit its range of motion.

Because whichever blade face 15, 16, or 17 being utilized is always correctly angled to the ground, irrespective of the angle of shaft 12, the need to constantly maintain a specific angle between the shaft 12 and the ground (in order to effectively scrape the ground surface) is eliminated. This feature is especially helpful when pushing or pulling material (i.e.—snow) up or down a sloped driveway, because the elongate shaft 12 can always be held in a comfortable position.

FIG. 4 shows a second embodiment 210 of the invention. Tool 210 is similar to tool 10 of FIGS. 1-3, but includes a locking device such as a knob 226, which cooperates with aperture 225 to secure the shaft 212 to shovelhead 214 at various positions, to accommodate specific shoveling needs.

Figure 5:
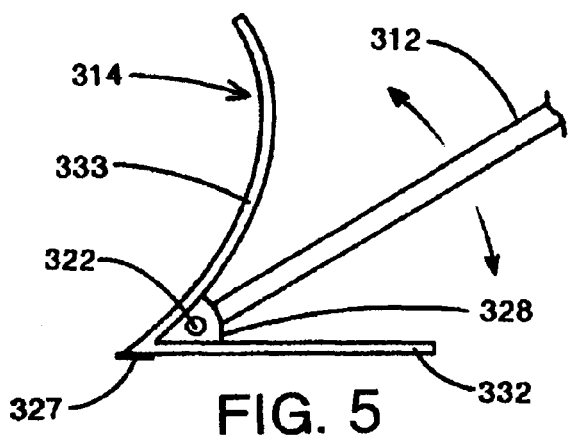
FIG. 5 is a side view of a pusher shovel in accordance with a third embodiment of the invention.
Figure 6:
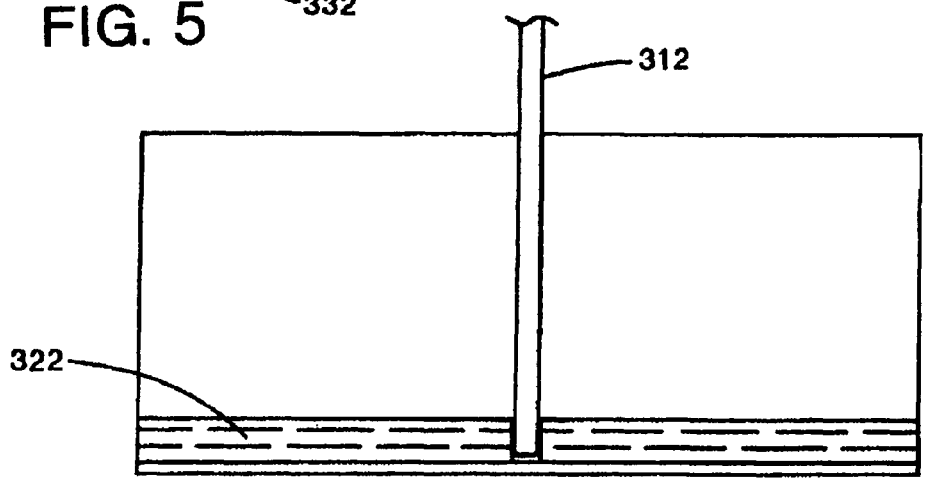
FIG. 6 is a rear view of the tool shown in FIG. 5.

FIGS. 5 and 6 show a third embodiment 310 of the invention. Tool 310 can also pull material, but is primarily intended to push material across the ground, and includes a shovelhead 314 comprised of two panels 332 and 333 which are rigidly connected to each other via bracket 328. Elongate shaft 312 is pivotally connected to bracket 328 by hinge pin 322, in the same manner as depicted in FIG. 3. This embodiment also features a steel reinforced leading edge 327.

FIGS. 7-9 show a fourth embodiment 410 of the invention. Tool 410 can also push and pull material, and includes two similarly curved elongate shaft segments 411 and 412, with shaft segment 411 being of slightly smaller or larger diameter, and extendable from shaft segment 412. As shown in FIG. 10, the cross-sectional shape of shaft segments 411 and 412 is elliptical, offering superior strength over a circular shape. After being fully extended from shaft segment 412, shaft segment 411 can be rotated 180 degrees and secured to shaft segment 412 by utilizing locking knob 426. The curved elongate handle of this invention can be comprised of two or more telescoping shaft segments, and may include two or more locking devices. Elongate shaft segment 412 is pivotally secured to bracket 428 by hinge pin 422. Bracket 428 can be integrally formed with or rigidly attached to panel 432.

In the illustrated embodiment 410, shaft segment 411 includes a spheroid-shaped handgrip 413, which makes the end of shaft segment 411 easier to hold on to, and less likely to slip from one's grip.

Shovelhead 414 can be unfolded into a generally flat shape (as shown in FIG. 9), making it easier to store. Shovelhead 414 comprises three rigid panels 432, 433, 434 which are connected along lateral edges by hinges 429 and 430, which may be integrally formed (e.g., "living hinges") with panels 432, 433 and 434.

The unhinged lateral edge 431 of panel 434 can be configured to interlock with a similarly shaped notch 435 in panel 432, thus forming a rigid structure. Panel 432 may also include a steel reinforced leading edge 427. As shown in FIG. 8, the elongate aperture 425 of panel 434 is open on one end, allowing shovelhead 414 to be unfolded. FIG. 8 also shows the shovel with elongate shaft segment 411 in the fully retracted position.

FIG. 11 shows a fifth embodiment 510 of the invention. Tool 510 is similar to tool 10 of FIGS. 1-3, but includes a shovelhead 514 having a circular or elliptical shaped aperture 525 which allows for universal (multi-axial) movement of shaft 512. Shaft 512 may be pivotally connected to shovelhead 514 via a ball and socket arrangement (i.e.—a spheroid-tipped shaft can be pushed and locked into a socket, which could be integrally formed with shovelhead 514). Though aperture 525 is a generally circular shape, other shapes could also be used (i.e.—square, diamond, triangular, or other shapes).

FIGS. 12 and 13 show a sixth embodiment 610 of the invention. Tool 610 includes a shovelhead 614 having four blade faces 615, 616, 617, 618, and is pivotally or rotatably attached to shaft 612, allowing for free rotation of shovelhead 614, with respect to shaft 612, around its axis of rotation. This design offers several different blade options for pushing or pulling material (i.e.—snow) across the ground or other surfaces, such as rooftops.

FIG. 14 shows a seventh embodiment 810 of the invention. Tool 810 is configured as a pusher/scraper, and may include a curved elongate shaft 812 which is pivotally or rotatably connected to tool head 814 by hinge pin 822. As with handle 612 of FIG. 13, this shaft may also rotate in a full circle around its axis of rotation. Tool head 814 may be constructed of various materials suitable for its application.

Figure 15:
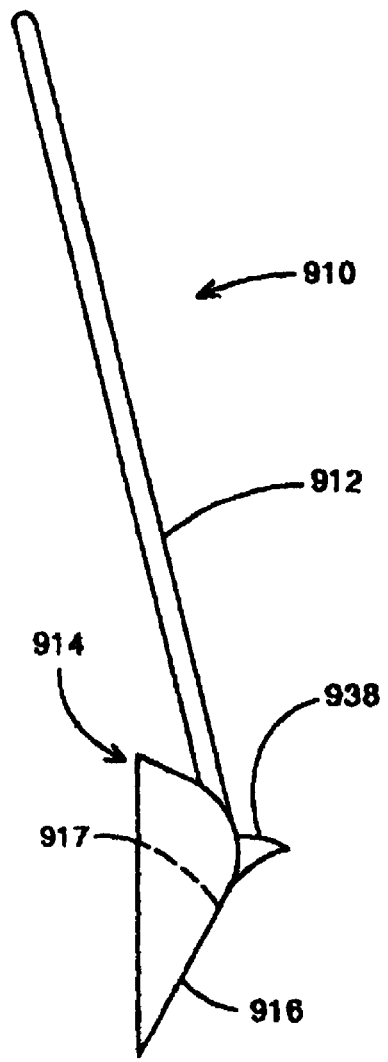
FIG. 15 is a side view of a combination scoop/pusher shovel in accordance with an eighth embodiment of the invention.
Figure 16:
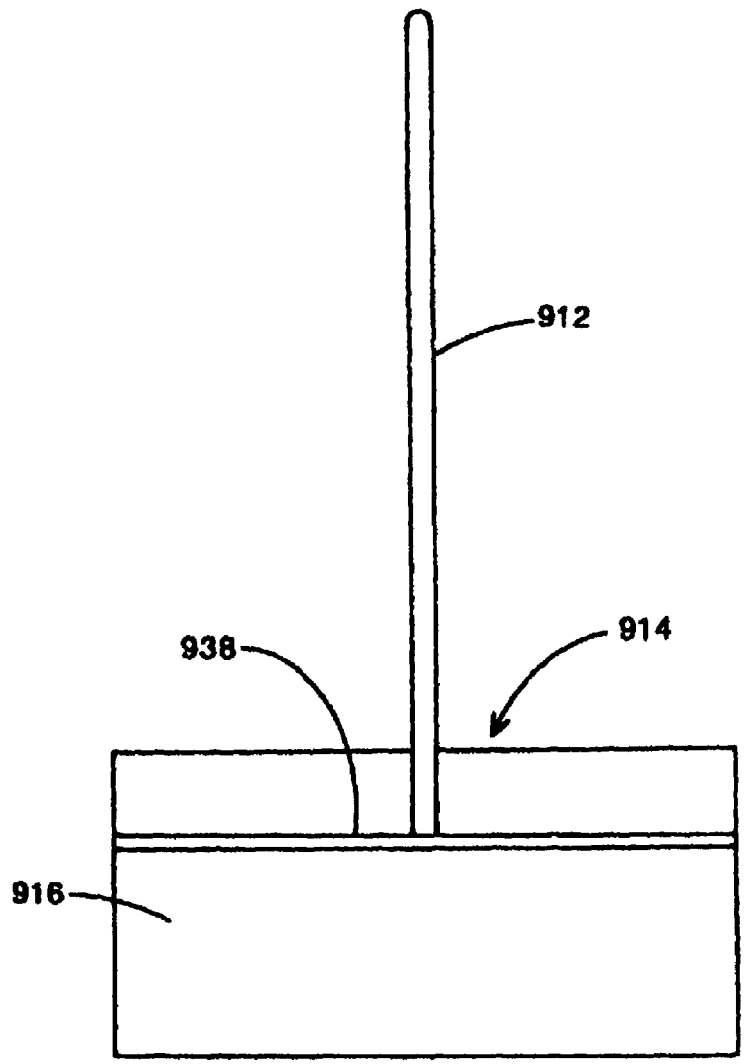
FIG. 16 is a front view of the pusher blade of the tool shown in FIG. 15.

FIGS. 15 and 16 show an eighth embodiment 910 of the invention. Tool 910 is designed as a combination scoop and pusher shovel, and includes an elongate shaft 912 which is rigidly attached to shovelhead 914. Shovelhead 914 comprises two blade faces 916 and 917, either of which can be utilized by rotating the shaft 180 degrees. Blade face 916, which is used as a pusher, includes a curved upper portion 938, which helps prevent material from passing over the top edge of blade face 916 as the tool is being pushed across the ground or other surface. This curved upper portion is also shown in FIG. 16 (a front view of tool 910).

The tools described above can be made from plastic, metal, rubber, fiberglass, composites, or any other suitable material. The steel edges can be configured into various shapes and profiles; and the elongate shaft can be easily detachable from the shovelhead, for easier storage.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A hand shovel, comprising:
an elongate shaft; and
a shovelhead having two fixed, non-adjustable, separate, concave blade faces which both face away from the elongate shaft and each other, each separate concave blade face having its own individual free top edge, and both separate concave blade faces being connected to each other by and sharing a single, straight, continuous, non-interrupted common bottom edge, the two individual free top edges and the bottom edge all being parallel with each other and horizontal with the ground surface when the shovel is used to push snow or other material across the ground, one of the separate concave blade faces always directly facing the ground when the shovel is used to push snow or other material across the ground, the shared, single common bottom edge being positioned at a point beyond the distal, lower end of the elongate shaft.

2. The shovel of claim 1, wherein the shovelhead includes side walls which extend continuously from both ends of the shared common bottom edge all the way to the top free edges of each separate concave blade face.

* * * * *